(12) United States Patent
Zurbuchen et al.

(10) Patent No.: US 8,085,304 B2
(45) Date of Patent: Dec. 27, 2011

(54) PHOTOGRAPHIC SILVER EMULSION-BASED DIGITAL ARCHIVAL STORAGE

(75) Inventors: Mark Alan Zurbuchen, Santa Monica, CA (US); Charles Thomas Hoskinson, Thousand Oaks, CA (US)

(73) Assignee: The Aerospace Corporation, El Segundo, CA (US)

( * ) Notice: Subject to any disclaimer, the term of this patent is extended or adjusted under 35 U.S.C. 154(b) by 444 days.

(21) Appl. No.: 12/469,644

(22) Filed: May 20, 2009

(65) Prior Publication Data
US 2010/0295967 A1 Nov. 25, 2010

(51) Int. Cl.
*G03C 5/00* (2006.01)
*H04N 5/225* (2006.01)

(52) U.S. Cl. .................... 348/207.99; 430/230

(58) Field of Classification Search .......... 430/219, 430/227, 230, 244, 249
See application file for complete search history.

(56) References Cited

U.S. PATENT DOCUMENTS

| | | | |
|---|---|---|---|
| 4,951,086 A * | 8/1990 | Hicks | 355/41 |
| 5,499,294 A * | 3/1996 | Friedman | 713/179 |
| 6,556,273 B1 * | 4/2003 | Wheeler et al. | 352/92 |
| 6,873,435 B1 * | 3/2005 | Tehranchi et al. | 358/1.9 |
| 7,212,322 B2 * | 5/2007 | Abhyankar et al. | 358/527 |
| 7,340,482 B2 * | 3/2008 | Abhyankar et al. | 382/305 |
| 7,340,607 B2 * | 3/2008 | Abhyankar et al. | 713/176 |
| 2003/0090531 A1 * | 5/2003 | Wong et al. | 347/1 |
| 2003/0174349 A1 * | 9/2003 | Abhyankar et al. | 358/1.9 |
| 2003/0233371 A1 * | 12/2003 | Abhyankar et al. | 707/104.1 |
| 2004/0153653 A1 * | 8/2004 | Abhyankar et al. | 713/179 |
| 2005/0040240 A1 * | 2/2005 | Jones et al. | 235/487 |
| 2005/0046817 A1 | 3/2005 | Wolfe et al. | |
| 2007/0297312 A1 | 12/2007 | Wolfe et al. | |
| 2008/0124003 A1 | 5/2008 | Wolfe et al. | |

OTHER PUBLICATIONS

Weiss, R. D., "Environmental Stability Study and Life Expectancies of Magnetic Media for Use with IBM 3590 and Quantum Digital Linear Tape Systems," Arkival Technology Corporation, *Final Report to the National Archives and Records Administration*, NAMA-01-F-0061 (Oct. 2001-Jun. 2002), pp. 1-94.

Byers, F. R., "Care and Handling of CDs and DVDs: A Guide for Librarians and Archivists," *NIST Special Publication 500-252* (Oct. 2003).

Slattery, O.; Lu, R.; Zheng, J.; Byers, F.; Tang, X., "Stability Coparison of Recordable Optical Discs—A Study of Error Rates in Harsh Conditions," *J. Res. Natl. Inst. Stand. Technol.*, vol. 109, 517-524 (Sep.-Oct. 2004).

Kenney, A. R.; Buckley, E., "Developing Digital Preservation Programs: the Cornell Survey of Institutional Readiness, 2003-2005," *Res. Libraries Group DigiNews*, vol. 9, No. 4, Article 1 (Aug. 15, 2005).

Iraci, J., "The Relative Stabilities of Optical Disc Formats," *Restaurator: International Journal for the Preservation of Library and Archival Material*, vol. 26, 134-150 (2005).

\* cited by examiner

*Primary Examiner* — Nicholas Giles (74) *Attorney, Agent, or Firm* — Henricks, Slavin & Holmes LLP (57) ABSTRACT

A photographic digital data archival apparatus includes an article of media that includes a substrate and one or more layers of silver-emulsion based light-sensitive material, the article of media being configured to store digital data in the one or more layers and including a human-readable portion that provides instructions on reading and interpreting the digital data using basic imaging and computing technologies that do not require a person reading the instructions to previously possess or first acquire, as a prerequisite, knowledge of a format or encoding scheme associated with the digital data.

49 Claims, 4 Drawing Sheets

PHOTOGRAPHIC SILVER EMULSION-BASED DIGITAL ARCHIVAL STORAGE

TECHNICAL FIELD

The invention relates generally to archival storage and, in particular, to a non-obsoleting digital archival technology and media including a human-readable portion that provides instructions on reading and interpreting the digital data using basic imaging and computing technologies.

BACKGROUND ART

The problem of a Digital Dark Ages looms before historians, archivists, librarians, and governments. Today, the functioning of our society relies almost completely upon vast numbers of documents that are stored digitally, yet digital records barely five or ten years old may be extremely difficult to access if they are stored on media that in the future falls out of favor. The situation over the long term is bleaker still, and there is a very real possibility that the vast majority of the records of our civilization, in particular, records stored in digital form, may not last more than 100 years. Digital media will not endure (bit rot)—magnetic storage fades, CDs fade and decompose, drive mechanisms corrode, and non-volatile RAM fade. Additionally, old formats will be lost (format rot)—file formats will be forgotten, encryption and compression schemes will be lost to memory, and PROMs will be indecipherable once the documentation or hardware systems are lost. Finally, equipment and components that are necessary to read old media may become obsolete and unavailable in the commercial market if they fail to maintain market share, and it is not possible to predict which technologies may fall out of favor at any far-off future date.

A prime example of the problem is the *BBC Domesday Book*, a re-publication of the original *Domesday Book* census of 11th-century England. The BBC update added to this record a great deal of information on the modern populace of Britain, with text, audio, video, and interactive programs. It was published in 1986 as a set of two laserdiscs, totaling one gigabyte (GB). Although the original record has endured in a readable format for over 900 years, the modern version became virtually impossible to access in only 15 years. This was due to the advance of digital standards and the failure of old and obsolete equipment.

Library and governmental institutions have an imperative to implement a media refreshing/migration program to counteract obsolescence and many institutions have sustainable funding provided specifically for long-term maintenance of digital data. A. R. Kenney, "Developing Digital Preservation Programs: the Cornell Survey of Institutional Readiness, 2003-2005," *Res. Libraries Group DigiNews* 9, n4, Art1 (2005). However, the media refreshing/migration program approach invites recurring costs and losses due to repeated migrations. A single solution for once-only archiving is desperately needed.

Digital storage is also susceptible to manipulation (e.g., alteration, corruption) when stored in rewritable formats, as all high-volume backup media such as magnetic tape are. Technologies capable of implementing legislated digital-information archiving requirements (such as Check21, 21 CFR Part 11, DoD5015.2, and HIPAA) do not exist. In fact, no permanent digital archival technology exists.

All existing digital storage media rely upon a specialized mechanical device for readout. Availability of a functioning readout device is necessary to retrieve any stored information.

CD-Rs and DVD-Rs are a commonly used for backup of digital data by 70% of library and government agencies. Id. These articles of media are based on organic dyes (pthalocyanine, cyanine, and azo) with a silver alloy reflective layer or layers in a polycarbonate body. These organic dyes fade naturally over time (O. Slattery, R. Lu, J. Zheng, F. Byers, and X. Tang, "Stability Coparison of Recordable Optical Discs—A Study of Error Rates in Harsh Conditions," *J. Res. Natl. Inst. Stand. Technol.* 109, 517 (2004)), and this kinetic process is accelerated by high humidity and temperature in aging tests, rapidly resulting in faded dyes, delaminations, and unreadable data (J. Iraci, "The Relative Stabilities of Optical Disc Formats," *Restaurator: International Journal for the Preservation of Library and Archival Material* 26, 134 (2005)). Degradation is often due to oxygen and water vapor entering through imperfections in the edge, through the polycarbonate body, or the lacquer coating, with the resulting oxidation and destruction of the data storage layer or the reflective layer. F. R. Byers, "Care and Handling of CDs and DVDs: A Guide for Librarians and Archivists," NIST (2003). The dyes are light-sensitive, and storage in a lit room accelerates aging. Manufacturers claim a shelf life of only 5 to 10 years for unrecorded discs. CD-Rs have a typical lifetime of 2 to 10 years, although manufacturers sometimes make unsupported claims of 100 years. Tests indicate that pthalocyanine CD-Rs are superior to other optical discs, including pthalocyanine DVD-Rs, which exhibit shorter readable-data lifetimes. See, Iraci. The internal error correction software of CD/DVD readers can mask read problems as a disc decays and bit error rates increase, with the user becoming aware only when a read failure occurs. Storage in a dark, dry nitrogen atmosphere can extend the lifetime, but incurs continual extra archiving expense.

Hard disks have high data storage reliability, but are integrated with a mechanical system. Over decades, the mechanical system is likely to degrade, and failure of that system, such as dry-out of the spindle bearing, results in loss of all data on the device.

Magneto-optical (MO) discs were touted as an archival medium several years ago, but the failure of that technology to be adopted widely has led to the obsoleting of the technology for most potential users. Today, only 20 years after their introduction, a working MO player is difficult to find in most areas, the media have become extraordinarily expensive, and use is limited to medical applications.

Magnetic tapes, stored in metal canisters, have magnetization lifetimes predicted to be 100 years if stored at 30% RH and ambient temperatures. R. D. Weiss et al., "Environmental Stability Study and Life Expectancies of Magnetic Media for Use with IBM 3590 and Quantum Digital Linear Tape Systems," *Final Report to the National Archives and Records Administration*, NAMA-01-F-0061 (2002). However, the binders for the magnetic particles can degrade more quickly. Id.

Flash drives are quite common today, but rely upon a trapped charge as a mechanism of storage, and are not expected to have any lifetime adequate for archiving or even backup.

Internet-based backup services are currently quite popular, but such systems are susceptible to any interruption. And in any case, these systems in the end must store the digital data in some form, such as hard drives or tape.

It would be helpful to be able to provide a digital data preservation technology that addresses one or more of the deficiencies of prior data storage technologies. Also, it would be helpful to be able to provide a digital data preservation technology that does not rely upon any specialized hardware.

SUMMARY OF THE INVENTION

The present invention involves apparatuses, systems, and methods for providing permanent archiving of digital data such that the digital data will be retrievable in the far future by a person who may not have knowledge of a format or encoding scheme associated with the digital data (i.e., naive agent). In an example embodiment, the digital data is stored on an article of photographic media that includes a silver-emulsion based light sensitive material. The article of photographic media can be in sheet, film, disc, or other forms.

In an example embodiment, a photographic digital data archival apparatus includes an article of media that includes a substrate and one or more layers of silver-emulsion based light-sensitive material, the article of media being configured to store digital data in the one or more layers and including a human-readable portion that provides instructions on reading and interpreting the digital data using basic imaging and computing technologies that do not require a person reading the instructions to previously possess or first acquire, as a prerequisite, knowledge of a format or encoding scheme associated with the digital data.

In an example embodiment, a photographic digital data archival system includes a media imprinting device configured to modify an article of photographic media, and a processor programmed to control the media imprinting device to impart digital data and a human-readable portion to the article of photographic media, the human-readable portion including instructions on reading and interpreting the digital data using basic imaging and computing technologies that do not require a person reading the instructions to previously possess or first acquire, as a prerequisite, knowledge of a format or encoding scheme associated with the digital data.

In an example embodiment, a photographic digital data archival method includes the steps of storing digital data in an article of photographic media, and imparting a human-readable portion to the article of photographic media, the human-readable portion including instructions on reading and interpreting the digital data using basic imaging and computing technologies that do not require a person reading the instructions to previously possess or first acquire, as a prerequisite, knowledge of a format or encoding scheme associated with the digital data.

DISCLOSURE OF INVENTION

Embodiments described herein utilize an analog archival medium (such as a silver-emulsion film) to preserve digital data in a manner that effectively eliminates the problem of "bit rot" for long-term archival or storage purposes. More specifically, an article of photographic media is employed. In an example embodiment, the article of media includes a silver-emulsion based light-sensitive material which can survive for millennia in dry ambient conditions and in the absence of UV light. The invention also eliminates the problem of "format rot" through the possible incorporation of a human-readable description of the encoding scheme and provides for non-obsoleting digital archiving technologies.

The article of media can take the form of a high-resolution silver-emulsion photographic film to provide a truly archival digital storage medium with an expected lifetime of hundreds of years supporting an infinite number of read cycles. Film has a media cost performance similar to other storage media ($/GB), and a weight performance competitive with other storage media (g/GB). For example, in the case of modern, high-resolution silver-emulsion film, which has a resolution of 120 lines/mm, a single 8×10 sheet can store 93 MB of space on a single 8×10 in piece of film for binary digital storage, with greater capacity possible (as discussed below). Five 93-MB sheets (465 MB) of emulsion-film digital storage weigh roughly the same as a 500-MB flash-drive, or a CD-ROM (~700 MB), the current choice in ephemeral archival media. With other modifications of the storage (as discussed below) single-sheet archiving of 3 GB or more is possible, yielding a cost performance for media (in terms of $/GB and g/GB) comparable to other media. But, in contrast to other media, it is a truly archival medium, and can persist for hundreds of years.

It should be pointed out that users can take into consideration that not all data in the digital domain is desirable to archive, so that the capacity of digital archiving media does not effectively constrain users significantly. Further, data-reduction strategies such as compression and reduction of bit-depth of images and similar items can be implemented to achieve the desired level of archiving.

Also, by way of example, the article of media can be made from Agfa Esb holographic film which has a resolution of 4000 lines/mm and five orders of magnitude of recordable contrast. In this case, the grain resolution of the medium does not limit the storage density. Rather, the areal storage density is limited by the wavelength of light (i.e., physics). This yields further increases in the data capacity of the storage medium.

Archival storage does not need to be rapidly readable, although reading an 8×10 sheet would take only about 10 minutes using a modern scanner, a speed penalty of only about 3× over other recordable media, but with the advantage of permanency.

Well-established chemical processes can be used to stabilize the particles of the photographic film such that they remain stable indefinitely. Even in the short-term, silver-emulsion film has an advantage over most other digital storage media because it can be immersed in water for up to five hours without degrading. It is also not susceptible to degradation from x-rays, cosmic rays, visible or infrared light, magnetic fields, freezing, physical flexion, or ungloved human handling. It needs no maintenance or refreshing and can be stored indefinitely. Thus, the recording and archiving of digital information using a permanent medium such as silver emulsion results in a digital data archival apparatus that is impervious to most threats to archived information, particularly those threats to digital information. These include x-rays, α-particles, magnetic fields, electrical fields, and moisture.

Figure 1:
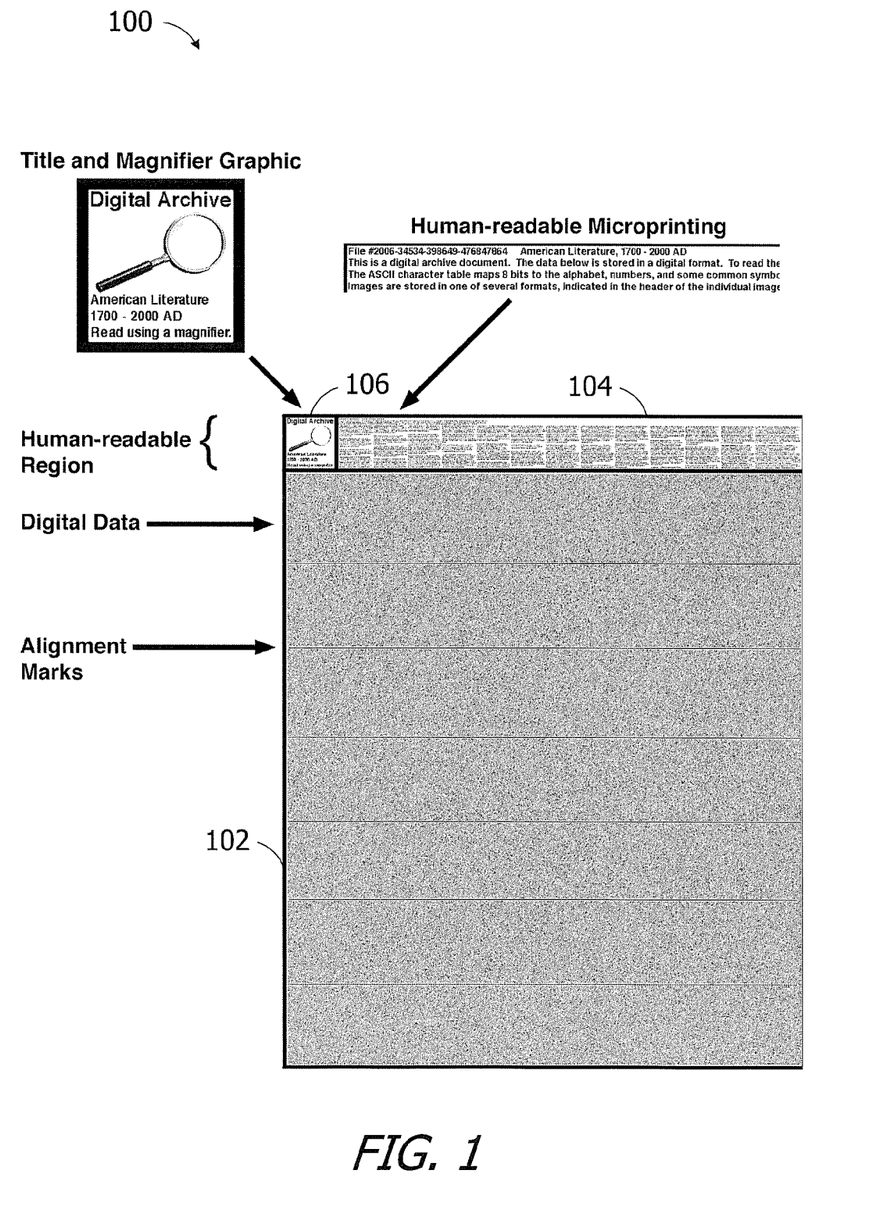
FIG. 1 shows an example article of photographic digital data archival media in sheet form.

Referring to FIG. 1, in this example embodiment, an article of media 100 is provided in the form of a sheet of silver-emulsion based light sensitive material. In this example embodiment, the article of media 100 includes a data portion 102 and a human-readable portion 104 as shown. The article of media 100 is configured to store digital data in the data region 102. In an example where high-resolution silver-emulsion film is employed, a digital archive sheet, 8×10 in$^2$, contains about 700 Mb of information. The digital data can be formatted in any manner, and any encoding scheme can be used.

In an example embodiment, the human-readable portion 104 provides instructions on reading and interpreting the digital data using basic imaging and computing technologies that do not require a person reading the instructions to previously possess or first acquire, as a prerequisite, knowledge of a format or encoding scheme associated with the digital data. This feature addresses the problem of "format rot" by permitting a person who merely possesses the ability to read text in a particular language (e.g., English) to be taught, step-by-step, how to use a computing device of the future, in conjunction with an optical character recognition device, to retrieve the digital data from the data portion 102. That the format of the digital data and/or encoding associated with the digital data may have been lost in the mists of time is of no relevance because the formatting and encoding information is contained in the article of media 100 and provided anew. Essentially, the instructions in the human-readable portion 104 provide a recipe or roadmap for decoding the digital data using basic imaging and computing technologies. In another embodiment, the instructions include text describing rudiments of analog-to-digital optical scanning, to take into account the possibility that such knowledge might also be unavailable to the persons or other life forms attempting to retrieve the digital data.

In an example embodiment, the digital format of the medium is described explicitly in the human-readable portion 104 of the article of media 100. This information can also be contained in a digital form in the digital data portion 102. By way of example, storage formats can be described to a significant extent using only an ASCII lookup table for characters, to convert the header portion of the digital information to a longer, more detailed human-readable text portion so that reading instrumentation can be reconstructed in the event that format information is not available from other sources. Digital data can be stored in any of a number of standard and custom formats, including ASCII text, TIF images, and so on. International standards are being developed for the archiving of digital data, such as the Open Archival Information System (OAIS), and the details of such standards could be included in the human-readable portion.

The instructions in the human-readable portion 104 can be provided in multiple languages and can also include instructions that are human-readable under aid of visual magnification and/or symbolic, non-language indicia. In this example embodiment, the human-readable portion 104 includes an introductory portion 106 (denoted "Title and Magnifier Graphic") that includes human-readable text and an image of a visual magnification device. Thus, in this example, symbolic, non-language indicia in the form of an image of a magnifying glass prompts a person to seek out a visual magnification device to assist in reading the text (denoted "Human-readable Microprinting") in the human-readable portion 104. Other images of symbolic, non-language, or language-based, indicia can be included in the introductory portion 106. In an example embodiment, the introductory portion 106 does not provide a preview of material contained in the digital data portion 102, nor does it provide metadata regarding the contents of the digital data portion 102; rather, the introductory portion 106 provides a cue to the viewer that the document contains archival data, and invites a naive user to use the aid of visual magnification in order to observe and read the human-readable portion, to receive instruction for reading the digital data. The symbolic, non-language, or language-based, indicia can also be included in the human-readable portion 104 or elsewhere on the article of media 100.

Many pages of text can be included in the human-readable portion 104. For example, the text could describe the basics of the digital storage format, such as 8-bit character encoding, the ASCII character table, and the basics of the image, sound, and video formats and encoding schemes. A set of standards for digital archiving, and whatever formats are settled upon, can be incorporated into this permanent storage approach. In an example embodiment, a person in the future will be able to read the instructions in the human-readable portion 104 using only a magnifying glass or simple microscope and, given access to a scanner and any type of digital computer, will be able to access the digital data from the data portion 102. In an example embodiment, the digital data in the data portion 102 can contain the file allocation information and other aspects of the digital storage architecture that may typically be found on the recording surface of any digital storage medium, such as hard disks or flash drives.

Figure 2:
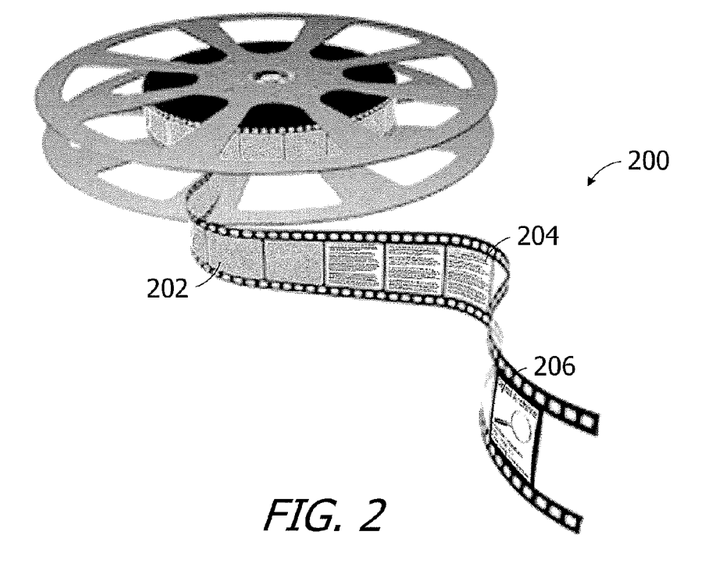
FIG. 2 shows an example article of photographic digital data archival media in film form.

Referring to FIG. 2, in this example embodiment, an article of media 200 is provided in the form of film (e.g., suitable for storage on a reel) that includes silver-emulsion based light sensitive material. The article of media 200 includes a data portion 202 and a human-readable portion 204 with an introductory portion 206, similar to the corresponding portions described with reference to the article of media 100. An advantage of the reel form is easier large-scale automation of storage or reading.

Figure 3:
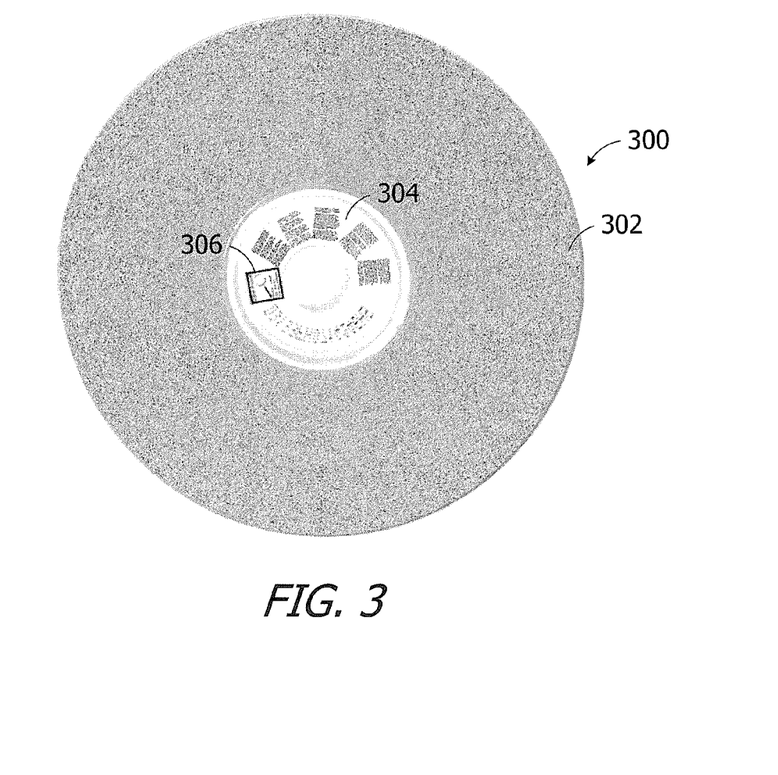
FIG. 3 shows an example article of photographic digital data archival media in disc form.

Referring to FIG. 3, in this example embodiment, an article of media 300 is provided in the form of a disc that includes silver-emulsion based light sensitive material. The article of media 300 includes a data portion 302 and a human-readable portion 304 with an introductory portion 306, similar to the corresponding portions described with reference to the article of media 100. An advantage of the disc form is that the silver-emulsion archival discs can be written using a modified CD-writing drive, in which a laser exposes successive spots on the disc to write the bits. The disc is then developed via known chemical processes. With a reflective metal layer under the silver emulsion layer, it would be possible to read such a disc using a modified CD-ROM drive. Alternatively, the alternating exposed and unexposed regions of a disc could modulate a transmitted beam in order to read the data.

In this example embodiment, the human-readable portion 304 also includes a calibration bar for calibration of the scanner and digital data reading device. Calibration bars, alignment marks, and the like can be included anywhere on the articles of media described herein.

The digital data can be encrypted. In an example embodiment, the instructions (e.g., in the human-readable portion or elsewhere on the article of media) include information pertaining to the encryption scheme.

In an example embodiment, the stored digital data is written in an unalterable state, and is therefore resistant to tampering.

In an example embodiment, the instructions include a description of how to perform a data integrity verification procedure. For example, the data integrity verification procedure includes a check sum error detection datum. An example of error checking of bit reading is a checksum, positioned at the end of each line, or the end of each series of lines. Other data integrity verification techniques can also be employed.

Figure 4:
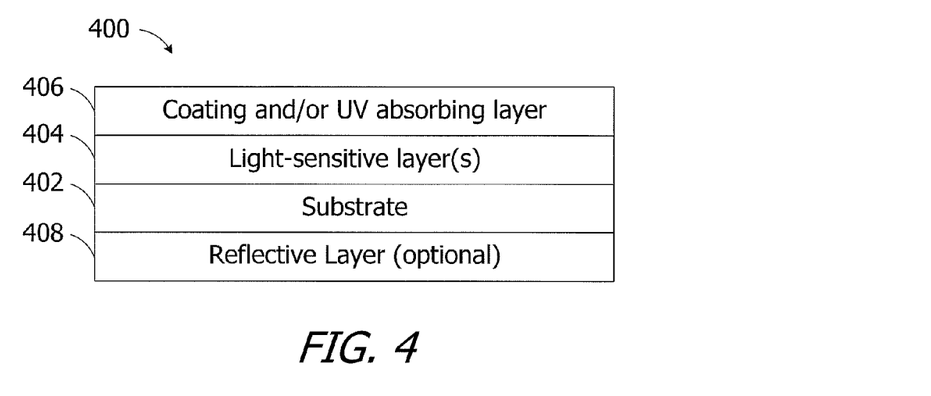
FIG. 4 is a cross-sectional view of an example article of photographic digital data archival media with one or more layers of light-sensitive material.

Referring to FIG. 4, in an example embodiment, an article of photographic digital data archival media 400 includes a substrate 402, one or more light-sensitive layers 404, a coating and/or UV absorbing layer 406, and a reflective layer 408 (optional). The substrate 402 supports at least one light-sensitive layer to which digital data can be written and subsequently developed. In an example embodiment, the substrate 402 includes a polymer material (such as nylon, polyester, cellulose acetate, or polycarbonate). In an example embodiment, the article of media (e.g., in the form of a sheet) includes a polymer substrate with a gelatin layer containing silver halide salts. The metal salt layer can also contain other noble metal constituents such as Ru, Rh, Pd, Os, Ir, Pt, and Au, such that emulsions of metals other than silver, or in combination with silver, can be used for storage In another example embodiment, the article of media can use other bit-encoding methods that are not dependent upon silver emulsion layers, but that rely on other layers that are capable of being written in the manners described in this disclosure to record bits or digital data that can be read by optical scanning techniques, and that endure through time. Examples may include chemical emulsion technologies that have yet to be developed. Other examples include physical etching or other chemical modification of the light-sensitive layer that can be optically detected.

In an example embodiment, the one or more light-sensitive layers 404 include multiple layers (e.g., Ag-emulsion layers), which can be independently addressed and written using techniques such as focal depth variation or others known in the art of DVD mechanism designers.

Although a coating and/or UV absorbing layer 406 is included in an example embodiment, in other embodiments, the article of media does not include "edge seals" or "overcoats" which might fail over time.

Figure 5:
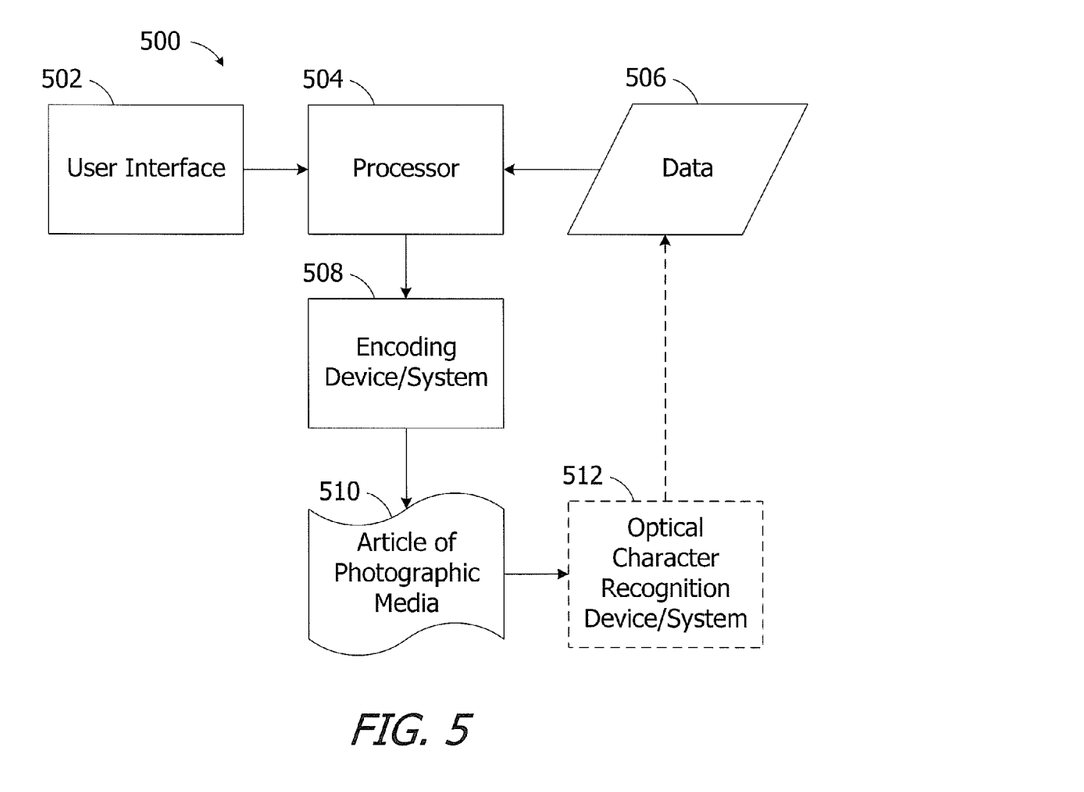
FIG. 5 shows an example photographic digital data archival system.

Referring to FIG. 5, in an example embodiment, a photographic digital data archival system 500 includes a user interface 502, a processor 504, and an encoding device/system 508 (e.g., media imprinting device). The media imprinting device includes, for example, a laser writer. In an example embodiment, writing is performed using rastered lasers.

In an example embodiment, the photographic digital data archival system 500 is at least semi-automated. For example, the encoding device/system 508 is configured to sequentially write (or burn) individual articles of media in an automated fashion, e.g., with automated media feeders or like mechanisms facilitating the process, to provide an integrated archiving system.

The processor 504 receives data 506 and is programmed to control the media imprinting device to impart digital data and a human-readable portion to an article of photographic media 510, the human-readable portion including instructions on reading and interpreting the digital data using basic imaging and computing technologies that do not require a person reading the instructions to previously possess or first acquire, as a prerequisite, knowledge of a format or encoding scheme associated with the digital data. The user interface 502 allows a user of the system to provide inputs or instructions to control modifications made to the article of photographic media 510.

In this example embodiment, the photographic digital data archival system 500 optionally also includes an optical character recognition device/system 512 for converting the human-readable portion to a machine readable and interpretable output. This output, in turn, can be used to provide additional data to the processor for inclusion in the digital data written to the article of media.

In an example embodiment, the media imprinting device is configured to encode the digital data such that the digital data can be imaged using short-wavelength light. In an example embodiment, the media imprinting device is configured to encode the digital data using gray scale encoding.

Figure 6:
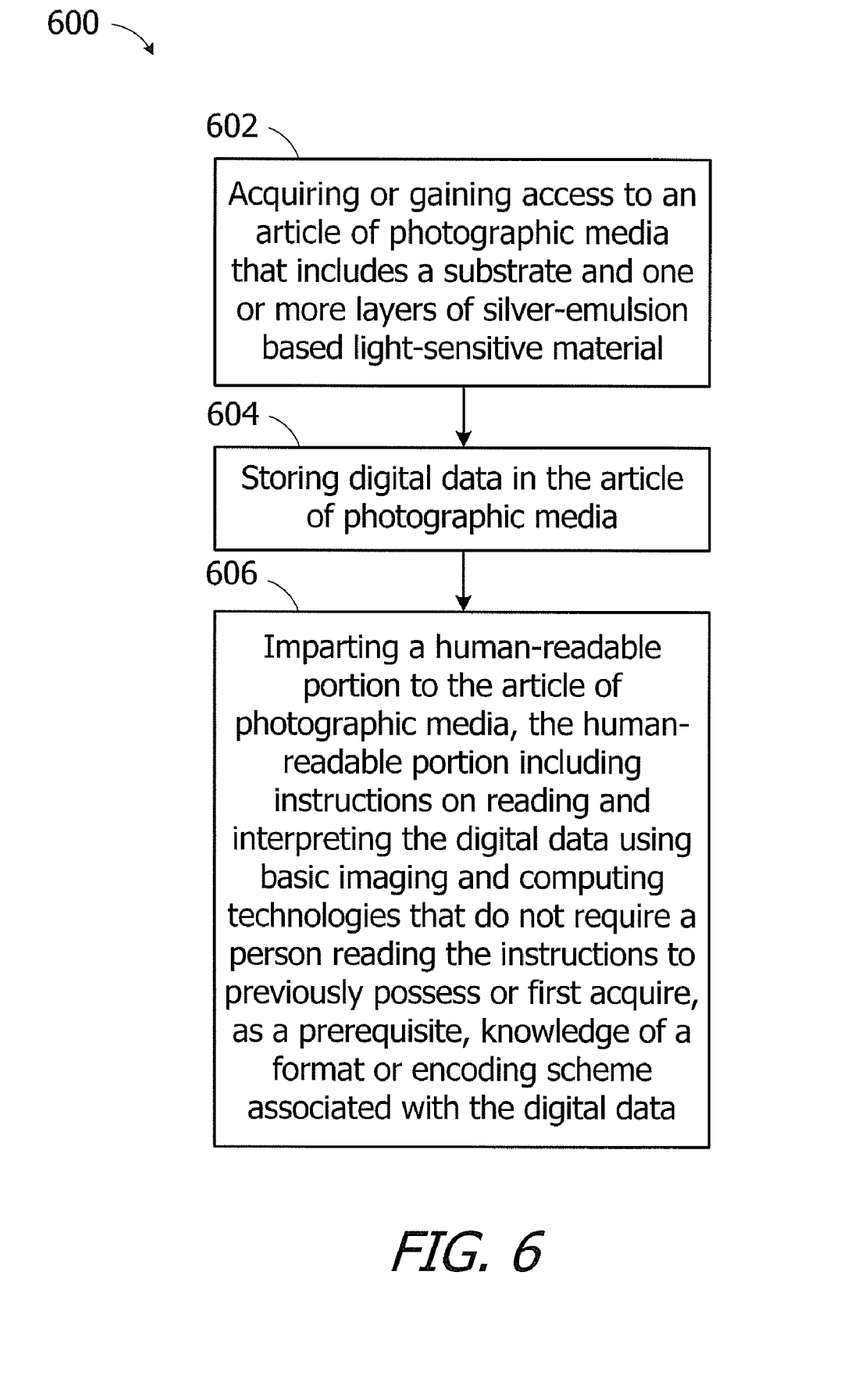
FIG. 6 is a flow diagram of an example photographic digital data archival method.

Referring to FIG. 6, an example photographic digital data archival method 600 includes, preliminarily, at 602, acquiring or gaining access to an article of photographic media that includes a substrate and one or more layers of silver-emulsion based light-sensitive material. At 604, digital data is stored in the article of photographic media. At 606, a human-readable portion is imparted to the article of photographic media, the human-readable portion including instructions on reading and interpreting the digital data using basic imaging and computing technologies that do not require a person reading the instructions to previously possess or first acquire, as a prerequisite, knowledge of a format or encoding scheme associated with the digital data In an example embodiment, the data is recorded by exposing the silver emulsion film via optical techniques known to those of skill in the art. Digital data comprising bits (binary data), for example, is recorded by exposure to a focused laser beam that is rastered across the surface, switching on and off to expose a bit or to leave dots unexposed, possibly with translation of the film between frames of laser exposure. Bits can be encoded in various ways. The simplest method is to have an exposed dot equal a 1, and an unexposed dot equal a 0. A second method of encoding bits is "non-return-to-zero, inverted encoding, as is used in CDs. A transition from an exposed to unexposed region corresponds to a 1, and no transition corresponds to a 0. This second method is appropriate for a disc as a storage format. It is important to note that reading speed is not critical, and is secondary to archival stability. A third method of encoding bits is to use the gray-scale capability of film to encode multiple-value pixels for increased storage density. In another example, a file system standard for optical disc media, such as ISO 9660, can be used.

Data is read, for example, by optically scanning the archival storage film, and translating the exposed and unexposed regions to bits in the computer. Details on the file formats are described in the human-readable portion of the film, such as end-of-file markers, etc. A simple computer program can manipulate the digital data from the film into digital computer files of the text, images, and audio stored on the device. The use of this method is not specific to any particular computer platform or file format. In an example embodiment, a simple, standard scheme of encoding data is selected and implemented using an archival device or system such as described herein.

In an example embodiment, a photographic exposure is used to expose sections of the archival film that are unchanging from one sheet (or other article of media) to the next. In an example embodiment, portions of the human-readable section are written by the same recording method used to write the digital data.

In an example embodiment where high-resolution silver-emulsion photographic film is used, minimum storage capacity based on the use of full-spectrum visible light is as follows:

Line density: Given 120 lines/mm resolution of the film, 120 lines/mm*25.4 mm/in=3048 lines/in, equivalent to 3048 dpi once digitized.

Areal density: $(3048 \text{ dots/in})^2 = 9290303$ pixels/$\text{in}^2 = 9.3$ Mb/$\text{in}^2$.

Sheet density: 9.3 Mb/$\text{in}^2$*(8 in×10 in)=743 Mb/8×10 sheet 743 Mb/8×10 sheet*8 bits/byte=93 MB per 8×10 sheet.

Improvement of the storage density can be achieved by using gray-scale in the pixels. Moreover, other data types can be used, such as octal or hexadecimal. Thus, storage increase is possible through the use of multiple values, such as 4-bit (16 gradations) rather than 1-bit pixels for a 4× increase, and 8-bit (256 values) for an 8× increase. High-quality scanners can consistently read 32,000 gradations or better. It should be noted that this type of encoding is still digital (discrete), but it is not binary.

Short-wavelength optical encoding sources, as are used in modern DVD writers, can be incorporated into the system to improve resolution by another factor of 4×.

By using the above-described modes of performance improvement, the storage capacity can be increased to at least 3 GB for an 8×10 sheet. This performance (g/GB) is competitive with other media.

In conclusion, the photographic digital data archival apparatuses, systems and methods described herein facilitate the economical and secure preservation of digital heritage materials in a permanent and low-maintenance fashion, ensuring that the information will be accessible in a truly archival manner in the far future.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A photographic digital data archival apparatus, comprising:
an article of media that includes a substrate and one or more layers of silver-emulsion based light-sensitive material, the article of media being configured to store digital data in the one or more layers and including a human-readable portion that provides instructions on reading and interpreting the digital data using basic imaging and computing technologies that do not require a person reading the instructions to previously possess or first acquire, as a prerequisite, knowledge of a format or encoding scheme associated with the digital data.

2. The photographic digital data archival apparatus of claim 1, wherein the article of photographic media is a disc.

3. The photographic digital data archival apparatus of claim 1, wherein the article of photographic media is in sheet form.

4. The photographic digital data archival apparatus of claim 1, wherein the one or more layers include a gelatin layer.

5. The photographic digital data archival apparatus of claim 1, wherein the one or more layers include a silver halide salt.

6. The photographic digital data archival apparatus of claim 1, wherein the one or more layers include noble metal or noble metal salt constituents.

7. The photographic digital data archival apparatus of claim 6, wherein the noble metal constituents are selected from a group consisting of: Ru, Rh, Pd, Os, Ir, Pt, and Au.

8. The photographic digital data archival apparatus of claim 1, wherein the article of media that includes a UV absorbing layer covering the one or more layers of silver-emulsion based light-sensitive material.

9. The photographic digital data archival apparatus of claim 1, wherein the substrate includes a polymer material.

10. The photographic digital data archival apparatus of claim 1, wherein the substrate includes nylon.

11. The photographic digital data archival apparatus of claim 1, wherein the substrate includes polyester.

12. The photographic digital data archival apparatus of claim 1, wherein the substrate includes cellulose acetate.

13. The photographic digital data archival apparatus of claim 1, wherein the substrate includes polycarbonate.

14. The photographic digital data archival apparatus of claim 1, wherein the digital data is encrypted.

15. The photographic digital data archival apparatus of claim 1, wherein the instructions include symbolic, non-language indicia.

16. The photographic digital data archival apparatus of claim 15, wherein the symbolic, non-language indicia includes an image of a visual magnification device.

17. The photographic digital data archival apparatus of claim 1, wherein the instructions are human-readable under aid of visual magnification.

18. The photographic digital data archival apparatus of claim 1, wherein the instructions include text describing rudiments of analog-to-digital optical scanning.

19. The photographic digital data archival apparatus of claim 1, wherein the instructions include a description of how to perform a data integrity verification procedure.

20. The photographic digital data archival apparatus of claim 19, wherein the data integrity verification procedure includes a check sum error detection datum.

21. A photographic digital data archival system, comprising:
a media imprinting device configured to modify an article of photographic media; and
a processor programmed to control the media imprinting device to impart digital data and a human-readable portion to the article of photographic media, the human-readable portion including instructions on reading and interpreting the digital data using basic imaging and computing technologies that do not require a person reading the instructions to previously possess or first acquire, as a prerequisite, knowledge of a format or encoding scheme associated with the digital data.

22. The photographic digital data archival system of claim 21, wherein the media imprinting device includes a laser writer.

23. The photographic digital data archival system of claim 21, wherein the media imprinting device is configured to encode the digital data such that the digital data can be imaged using short-wavelength light.

24. The photographic digital data archival system of claim 21, wherein the media imprinting device is configured to encode the digital data using gray scale encoding.

25. The photographic digital data archival system of claim 21, further including:
a user interface through which a user of the system provides inputs or instructions to control modifications made to the article of photographic media.

26. The photographic digital data archival system of claim 21, wherein the article of photographic media is a disc.

27. The photographic digital data archival system of claim 21, wherein the article of photographic media is in sheet form.

28. The photographic digital data archival system of claim 21, wherein the digital data is encrypted.

29. The photographic digital data archival system of claim 21, wherein the instructions include symbolic, non-language indicia.

30. The photographic digital data archival system of claim 29, wherein the symbolic, non-language indicia includes an image of a visual magnification device.

31. The photographic digital data archival system of claim 21, wherein the instructions are human-readable under aid of visual magnification.

32. The photographic digital data archival system of claim 21, wherein the instructions include text describing rudiments of analog-to-digital optical scanning.

33. The photographic digital data archival system of claim 21, wherein the instructions include a description of how to perform a data integrity verification procedure.

34. The photographic digital data archival system of claim 33, wherein the data integrity verification procedure includes a check sum error detection datum.

35. A photographic digital data archival method, comprising the steps of:
   storing digital data in an article of photographic media; and
   imparting a human-readable portion to the article of photographic media, the human-readable portion including instructions on reading and interpreting the digital data using basic imaging and computing technologies that do not require a person reading the instructions to previously possess or first acquire, as a prerequisite, knowledge of a format or encoding scheme associated with the digital data.

36. The photographic digital data archival method of claim 35, wherein storing digital data includes encoding the digital data.

37. The photographic digital data archival method of claim 36, wherein the digital data is encoded such that the digital data can be imaged using short-wavelength light.

38. The photographic digital data archival method of claim 36, wherein the digital data is encoded using gray scale encoding.

39. The photographic digital data archival method of claim 35, wherein the digital data is written to the article of photographic media using a laser writer.

40. The photographic digital data archival method of claim 35, wherein the human-readable portion is written to the article of photographic media using a laser writer.

41. The photographic digital data archival method of claim 35, wherein the article of photographic media is a disc.

42. The photographic digital data archival method of claim 35, wherein the article of photographic media is in sheet form.

43. The photographic digital data archival method of claim 35, wherein the digital data is encrypted.

44. The photographic digital data archival method of claim 35, wherein the instructions include symbolic, non-language indicia.

45. The photographic digital data archival method of claim 44, wherein the symbolic, non-language indicia includes an image of a visual magnification device.

46. The photographic digital data archival method of claim 35, wherein the instructions are human-readable under aid of visual magnification.

47. The photographic digital data archival method of claim 35, wherein the instructions include text describing rudiments of analog-to-digital optical scanning.

48. The photographic digital data archival method of claim 35, wherein the instructions include a description of how to perform a data integrity verification procedure.

49. The photographic digital data archival method of claim 48, wherein the data integrity verification procedure includes a check sum error detection datum.

\* \* \* \* \*